United States Patent
Goldberg et al.

(10) Patent No.: US 7,330,801 B2
(45) Date of Patent: Feb. 12, 2008

(54) SIGNAL SEPARATION USING RANK DEFICIENT MATRICES

(75) Inventors: Steven J. Goldberg, Downingtown, PA (US); Yogendra Shah, Exton, PA (US)

(73) Assignee: Interdigital Technology Corporation, Wilimington, DE (US)

(*) Notice: Subject to any disclaimer, the term of this patent is extended or adjusted under 35 U.S.C. 154(b) by 0 days.

(21) Appl. No.: 11/461,094

(22) Filed: Jul. 31, 2006

(65) Prior Publication Data

US 2007/0024502 A1 Feb. 1, 2007

Related U.S. Application Data

(60) Provisional application No. 60/703,609, filed on Jul. 29, 2005.

(51) Int. Cl.
*G06F 19/00* (2006.01)
*G06F 15/00* (2006.01)
*G01S 3/16* (2006.01)

(52) U.S. Cl. .......................... 702/85; 702/196; 342/383

(58) Field of Classification Search ................ 702/85, 702/190–197; 342/350, 367, 378, 380–384; 375/148

See application file for complete search history.

(56) References Cited

U.S. PATENT DOCUMENTS

| | | | | |
|---|---|---|---|---|
| 5,706,402 A | * | 1/1998 | Bell | 706/22 |
| 5,959,966 A | * | 9/1999 | Torkkola | 370/203 |
| 6,188,352 B1 | * | 2/2001 | Choi et al. | 342/378 |
| 6,642,887 B2 | * | 11/2003 | Owechko | 342/373 |
| 6,711,528 B2 | * | 3/2004 | Dishman et al. | 702/189 |
| 6,799,170 B2 | * | 9/2004 | Lee et al. | 706/20 |
| 6,801,161 B2 | * | 10/2004 | Lehtomaki et al. | 342/377 |
| 6,931,362 B2 | * | 8/2005 | Beadle et al. | 702/190 |
| 6,983,264 B2 | * | 1/2006 | Shimizu | 706/22 |
| 6,993,460 B2 | * | 1/2006 | Beadle et al. | 702/196 |
| 7,047,043 B2 | * | 5/2006 | Reilly et al. | 455/561 |
| 7,079,988 B2 | * | 7/2006 | Albera et al. | 702/196 |
| 7,085,711 B2 | * | 8/2006 | Kadambe | 704/201 |

(Continued)

OTHER PUBLICATIONS

Li et al., Blind Separation of Linear Mixtures of Digital Signals Using Successive Interference Cancellation Iterative Least Squares, 1999 IEEE, pp. 2703-2706.*

(Continued)

*Primary Examiner*—John Barlow
*Assistant Examiner*—Toan M. Le
(74) *Attorney, Agent, or Firm*—Allen, Dyer, Doppelt, Milbrath & Gilchrist, P.A.

(57) ABSTRACT

A communications device includes an antenna array for receiving different summations of source signals from a plurality of signal sources, a receiver coupled to the antenna array for receiving the different summations of source signals, and a signal separation processor coupled to the receiver. Processing by the signal separation processor includes creating a matrix based upon the different summations of source signals, with the matrix being defined by linear independent equations with fewer equations than unknowns. The matrix is underdetermined, and parameters associated with the matrix are modified based upon different sets of parameter values, and respective matrix quality factors associated with the different sets of parameter values are determined. The matrix is then biased with a preferred set of parameter values so that the solution space may be narrowed for obtaining a solution.

34 Claims, 7 Drawing Sheets

U.S. PATENT DOCUMENTS

| | | | |
|---|---|---|---|
| 7,113,129 B2 * | 9/2006 | Goldberg | 342/378 |
| 7,133,699 B1 * | 11/2006 | Owechko et al. | 455/562.1 |
| 2006/0066481 A1 | 3/2006 | Goldberg | 342/378 |
| 2007/0005749 A1 * | 1/2007 | Sampath | 709/223 |

OTHER PUBLICATIONS

Yao et al., Blind Detection of Synchronous CDMA in Non-Gaussian Channels, Jan. 2004, IEEE Transactions on Signal Processing, vol. 52, No. 1, pp. 271-279.*

Yao et al., On Regularity and Identifiability of Blind Source Separation Under Constant-Modulus Constraints, Apr. 2005, IEEE Transactions on Signal Processing, vol. 53, No. 4, pp. 1272-1281.*

Donoho et al., The Simplest Solution to an Underdetermined system of Linear Equations, ISIT 2006, Seattle, USA, Jul. 9-14, 2006.

Donoho, For Most Large Underdetermined Systems of Linear Equations the Minimal $\lambda^1$-norm Solution is Also the Sparsest Solution, Sep. 16, 2004.

* cited by examiner

SIGNAL SEPARATION USING RANK DEFICIENT MATRICES

RELATED APPLICATION

This application claims the benefit of U.S. Provisional Application Ser. No. 60/703,609 filed Jul. 29, 2005, the entire contents of which are incorporated herein by reference.

FIELD OF THE INVENTION

The present invention relates to the field of signal processing, and more particularly, to separating desired source signals from a mixture of source signals in which rank deficient matrices are formed.

BACKGROUND OF THE INVENTION

In communications networks there are source signals intended for a specific communications device, and there are source signals intended for other communications devices operating within the same frequency band. There are also sources of noise which produce signals that are not used for communications, but are received by the communications devices as well.

To facilitate decoding of the source signals of interest, signal separation is used to separate the signals received by a communications device. If the signals can be separated without any knowledge about the nature of the signals or the transformations that occur due to interactions between the signals and the communication channel, then this is known as blind signal separation In practical implementations, any knowledge that is available is often exploited In this case, the signal separation is semi-blind or non-blind. When the processing is non-blind, signal extraction techniques are often used instead of separation The difference being that more of the interferers are treated as noise than in the separation procedures In blind signal separation techniques, the received signals are often compactly represented by matrix equations of the form:

$$x = As + n \qquad \text{Equation 1}$$

where x is the received signal vector, A is the mixing matrix, s is the received vector composed of desired and undesired signals which are separable by signal processing, and n is an aggregate noise vector composed of random noise sources and any actual signal not included in the s vector The mixing matrix A and signals remain combined in the received signal vector s such that $$y = W(As) + Wn = Wx \qquad \text{Equation 2}$$

where W is the separation matrix, and y is a vector that is a subset of s in an unknown order with scaling changes. If all the signals are not separable, then the noise term n includes the residual signal due to the unidentifiable sources.

In semi-blind or non-blind signal separation techniques, A is referred to as the channel matrix, and the signal vector s may be solved by determining the inverse channel matrix:

$$s' = A^{-1}x = A^{-1}(As) + A^{-1}n = s + A^{-1}n \qquad \text{Equation 3}$$

s' is therefore the signal vector of interest plus noise multiplied by the inverse channel matrix. Traditional techniques may be used to find the inverse of the channel.

For purposes of discussion, the channel matrix and the mixing matrix will be generally referred to herein simply as the matrix. Regardless of whether the matrix is a mixing matrix for blind signal separation or a channel matrix for non-blind/semi-blind signal separation, the rank of the matrix determines how many signals can actually be separated. For example, a matrix having a rank of 4 means that 4 source signals can be separated. Ideally, the rank of the matrix should at least be equal to the number of signal sources. The larger the rank, the more signals that can be separated.

If there is an equal number of linear equations in the matrix as there are unknowns, then the matrix is said to be rank sufficient. To solve a rank sufficient matrix, an L0-norm technique can be used to provide the unique solution. This is the ideal case in which the matrix is adequately populated so that the number of unknown variables is equal to the number of linear equations.

However, when the matrix contains more unknown variables than linear equations, the matrix is underdetermined. In an underdetermined matrix, various combinations of the variables may be utilized to satisfy the matrix constraints. In this situation, there are infinitely many solutions, One approach to solving a rank deficient matrix is to increase the rank of the matrix. U.S. published patent application No. 2006/0066481 discloses several such techniques for increasing the rank of the matrix. This patent is assigned to the current assignee of the present invention, and is incorporated herein by reference in its entirety. To increase the rank of the matrix associated with a communications device, more antennas may be added to populate the matrix with additional linearly independent signal sums. However, small portable communications devices have little available volume for a large number of antennas, and mounting the antennas on the outside of the communications devices is a problem for the users.

Consequently, there is a need to separate signals from an underdetermined matrix without increasing the number of antennas. Research by David Donoho of Stanford University concludes that for most underdetermined systems of equations, when a sufficiently sparse solution exits, it can be found by convex optimization. More precisely, for a given ratio of unknowns (m) to equations (n), there is a threshold p so that most large n by m matrices generate systems of equations with two properties: 1) if convex optimization is run to find an L1-norm minimal solution, and the solution has fewer than pn non-zeros, then this is the unique sparsest solution to the equations, and 2) if the result does not have pn non-zeros, there is no solution with <pn non-zeros.

Donoho has shown that under specific conditions rank deficient matrices can be uniquely solved. However, a problem remains that while the number of solutions may be reduced to a finite number or at least a more constrained set, a unique solution may still not be obtained.

SUMMARY OF THE INVENTION

In view of the foregoing background, it is therefore an object of the present invention to obtain a unique solution to rank deficient matrices if a unique solution is not initially obtained.

This and other objects, features, and advantages in accordance with the present invention are provided by a communications device comprising an antenna array for receiving different summations of source signals from a plurality of signal sources, and a receiver coupled to the antenna array for receiving the different summations of source signals. A signal separation processor is coupled to the receiver.

The signal separation processor performs the following. A matrix based upon the different summations of source signals is created, with the matrix being defined by linear independent equations with fewer equations than unknowns. In other words, the matrix is underdetermined.

The signal separation processor separates from the matrix a desired source signal from the plurality of source signals, determines an error rate associated with the desired source signal, and compares the error rate to a threshold. Separating from the matrix the desired source signal from the plurality of source signals may be based upon a convex optimization. If the error rate is not acceptable based upon the comparing, then parameters associated with the matrix are modified based upon a first set of parameter values and based upon at least one second set of parameter values The signal separation processor also determines respective matrix quality factors associated with the first set of parameter values and with the at least one second set of parameter values, and compares the respective matrix quality factors for determining a preferred set of parameter values. The matrix is biased with the preferred set of parameter values.

The signal separation processor also separates from the biased matrix the desired source signal from the plurality of source signals In addition, the above steps may be repeated so that the biased matrix is biased with a new preferred set of parameters. As a result, if the rank deficient processing initially performed on the matrix was not able to determine a unique solution, then parameters associated with the matrix are modified based upon different sets of parameter values, and respective matrix quality factors associated with the different sets of parameter values are determined. The matrix is then biased with the preferred set of parameter values so that the solution space may be narrowed for obtaining a solution.

In one approach for narrowing the solution space, the parameters associated with the matrix are modified so that the respective matrix quality factors are based upon error rates associated with the first set of parameter values and the at least one second set of parameter values.

In another approach for narrowing the solution space, the parameters associated with the matrix are modified so that the respective matrix quality factors are based upon constellation clouds associated with the first set of parameter values and the at least one second set of parameter values.

In yet another approach for narrowing the solution space, the parameters associated with the matrix are modified so that the respective matrix quality factors are based upon determined lengths of Viterbi paths associated with the first set of parameter values and the at least one second set of parameter values.

Each set of parameter values associated with the matrix may correspond to a range interval of solutions of the matrix. At least a portion of the range intervals of solutions may overlap. The linear independent equations include channel coefficients, and each set of parameter values associated with the matrix may correspond to a range interval of the channel coefficients. Moreover, creating the matrix may also include determining a power level of the different summations of source signals, wherein each set of parameter values associated with the matrix may correspond to a range interval of the power levels. Moreover, creating the matrix may also include placing restrictions on the relative values between the entries of the signal solutions vector.

Yet another option for narrowing the solution space is to increase the rank of the matrix. The processor may be configured so that after determining the error rate and before determining the respective matrix quality factors, entries are added to the matrix so that a number of the unknowns in the matrix is reduced, restricted in range in regards to a fixed value or values, or in relationship to other variables. The added entries may be based upon at least one of adjusting range intervals of the matrix, and adjusting power levels of the matrix.

The antenna array comprises at least one antenna element. The at least one antenna element may comprise a plurality of active antenna elements so that the antenna array forms a phased array. Alternately, the at least one antenna element comprises a plurality of active antenna elements so that the antenna array forms a switched beam antenna. Alternately, the at least one antenna element comprises a plurality of active antenna elements subject to a change of characteristic impedance by either loading elements or ground planes.

Another aspect of the present invention is directed to a method for operating a communications as defined above.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime, double prime and triple prime notations are used to indicate similar elements in alternative embodiments.

In communications networks there are source signals intended for a specific communications device, and there are source signals intended for other communications devices operating within the same frequency band. There are also sources of noise which produce signals that are not used for communications, but are received by the communications devices as well. To facilitate decoding of the source signals of interest, various signal separation techniques are used.

Figure 1:
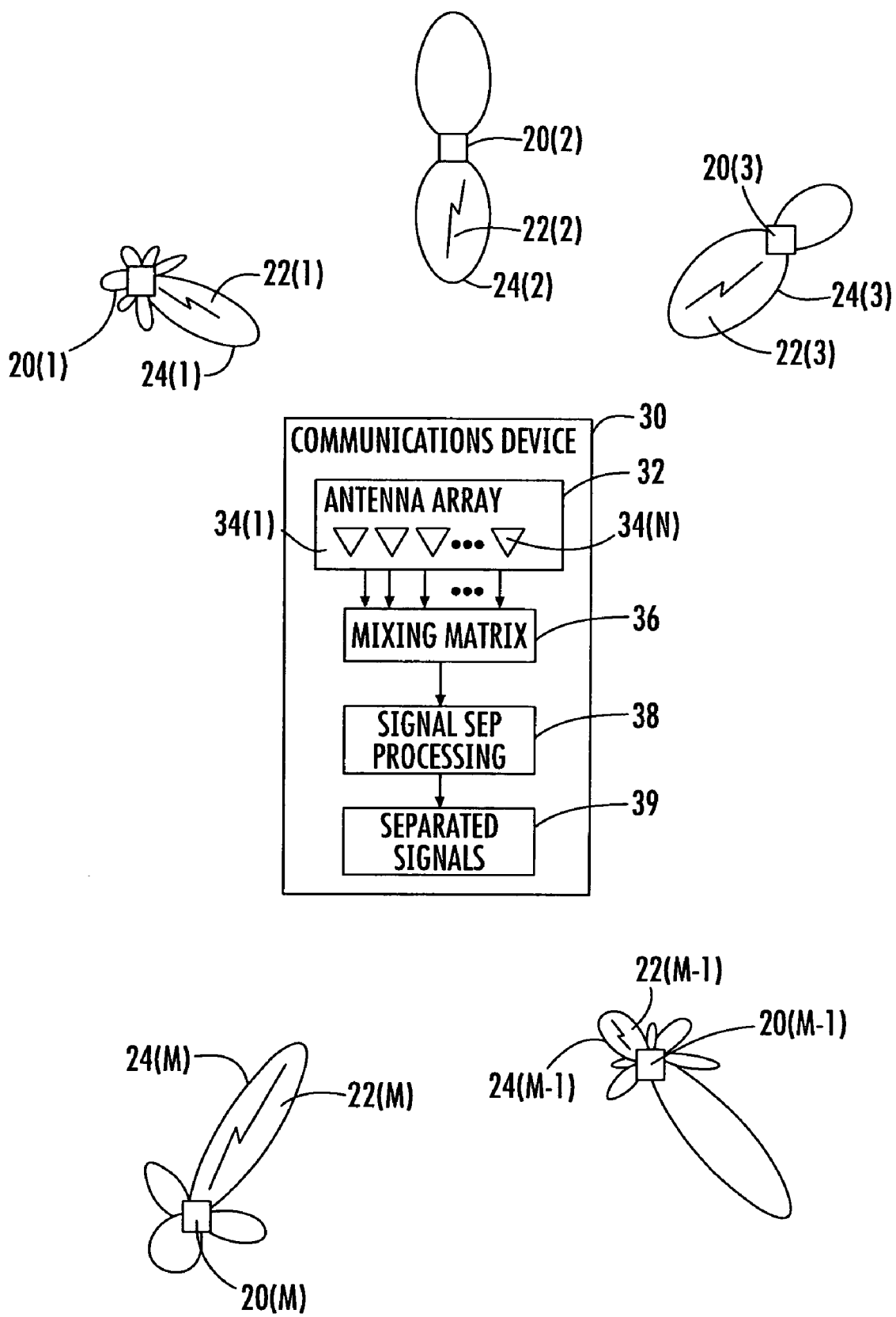
FIG. 1 is a block diagram of a typical operating scenario in which a communications device receives desired and undesired signals from their respective signal sources in accordance with the present invention.

A typical scenario is illustrated in FIG. 1, in which a plurality of signal sources 20 transmit source signals 22. The source signals 22 are transmitted in a direction based upon generated antenna beams 24 associated with each respective signal source 20, The plurality of signal sources 20 include a first signal source 20(1) through an Mth signal source 20(M). Likewise, the respective source signals are referenced 22(1)-22(M) and the corresponding antenna beams are referenced 24(1)-24(M). More straightforward implementations are often utilized in communications networks in the form of omni-directional antenna patterns or directional antenna patterns.

The communications device 30 jointly extracts the mixture of source signals received by the antenna array 32 by sampling an aggregate or composite of the received source signals. The output of each antenna element 34 is modeled as a summation of the source signals 22 after having been convolved with the impulse response of the channel, i.e., the propagation path between the output of a signal source 20 and the output of an antenna element 34 plus additive Gaussian noise.

The antenna array 32 thus receives a linear combination or mixture of the source signals 22 from the signal sources 20. The illustrated antenna array 32 comprises a plurality of antenna elements 34, with each antenna element providing at least one linear combination or mixture of the source signals 22 from the signal sources 20. The antenna elements 34 include a first antenna element 34(1) through an Nth antenna element 34(N). However, even though the antenna array 32 is illustrated with a plurality of antenna elements 34(1)-34(N), the array may comprise only a single antenna element for receiving the linear combination or mixture of the source signals 22 from the signal sources 20.

The received source signals 22(1)-22(M) are initially formed into a matrix 36 for processing by signal separation processing module 38. If the matrix is rank sufficient, that is, it has a unique solution, then the communications device 30 uses either blind signal separation techniques or non-blind/semi-blind signal separation techniques for separating the source signals in the matrix 36. The separated signals are represented by reference 39.

However, if the matrix 36 is rank deficient, then there is no unique solution. The matrix 36 is rank deficient when the linear independent equations are less then the unknowns. In this case, there are infinitely many solutions for the signal separation processing module 38 to choose from As discussed above, Donoho concludes that for most underdetermined systems of equations, when a sufficiently sparse matrix exits, it can be found by convex optimization. The separated signals are also represented by reference 39.

Figure 2:
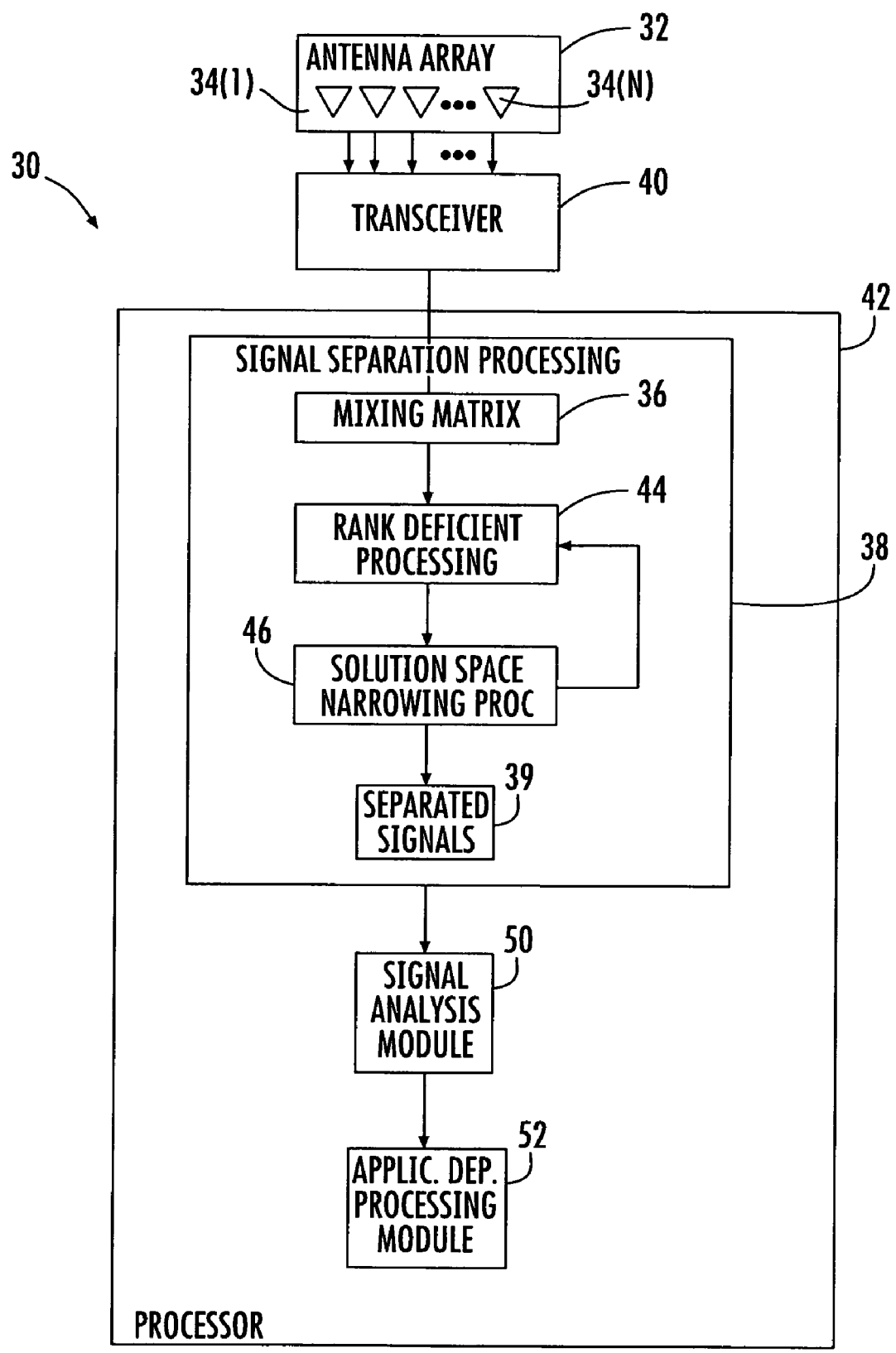
FIG. 2 is a more detailed block diagram of the communications device shown in FIG. 1.

The communications device 30 for separating source signals provided by the M signal sources 20(1)-20(M) will now be discussed in greater detail with reference to FIG. 2, and with an emphasis being placed on separating signals when the matrix 36 is rank deficient. The antenna array 32 is not limited to any particular configuration, and may include one or more antenna elements 34(1)-34(N) as noted above. When there is more than one antenna element 34(1)-34(N), they may be configured so that the antenna array 32 forms a phased array or switched beam antenna, for example. A transceiver 40 is connected downstream to the antenna array 32 for receiving up to the at least N different summations of the M source signals 22.

As an alternative to the phased array antenna or switched beam antenna changing the antenna patterns, a ground plane or loading elements may also be utilized via changes in characteristic impedance to deform the antenna array patterns. More particularly, the antenna array may comprise a ground plane adjacent the at least one antenna element, and the at least one antenna element may comprise an active antenna element, and at least one passive antenna elements. The passive antenna element comprises an upper half and a corresponding lower half, and a variable reactive load connecting the upper half to the ground plane for changing the antenna pattern. Alternatively, the ground plane is adjacent the at least one antenna element, and a controller is coupled to the ground plane for changing an antenna pattern. The controller includes an RF choke, for example. These two alternatives are discussed in greater detail in the above referenced patent application assigned to the current assignee of the present invention.

A processor 42 is downstream to the transceiver 40. Even though the processor 42 is illustrated separate form the transceiver 40, the processor may also be included within the transceiver. Even though the mixing matrix 36 and the separated signals 39 were shown separate from the signal separation processing module 38, they may also be included within the module as shown in FIG. 2.

The different summations of the M source signals 22 received by the transceiver 40 are used to populate the matrix 36, which in this case is underdetermined. The underdetermined matrix 36 is then processed by a rank deficient processing module 44 using convex optimization for example, and if a solution to the matrix cannot be determined, the solution space narrowing processing module 46 processes the matrix 36 in order to narrow the solution space for determining a solution to the matrix.

The solution space narrowing processing module 46 selects subsets of solution space values of the matrix 36 so that the matrix can be biased with one of the subsets for obtaining a solution for data processing. As will be discussed in greater detail below, the solution space for the matrix 36 may be narrowed based upon error rates, constellation tightness and Viterbi path lengths.

Once the signals are separated, they undergo signal analysis by a signal analysis module 50 to determine which signals are of interest and which signals are interferers. An application dependent processing module 52 processes the signals output from the signal analysis module 50.

The decision on which signals are of interest may not always involve the final signal to be decoded. For instance, the application may call for identifying interferers and subtracting them from the different summations of the received source signals, and then feeding the reduced signal to a waveform decoder. In this case, the signals of interest are the ones that ultimately end up being rejected Donoho discloses in two separate but related papers that rank deficient matrixes can be solved using convex optimization, or Kolmogorov complexity minimization. The first paper is titled "For Most Large Undetermined Systems of Linear Equations The Minimal $l^1$-norm Is Also The Sparest Solution", dated Sep. 16, 2004, and the second paper is titled "The Simplest Solution To An Undetermined System Of Linear Equations" dated Jul. 9-14, 2006. Both of these papers are incorporated herein by reference in their entirety The separated signals are also represented by reference 39.

Figure 3:
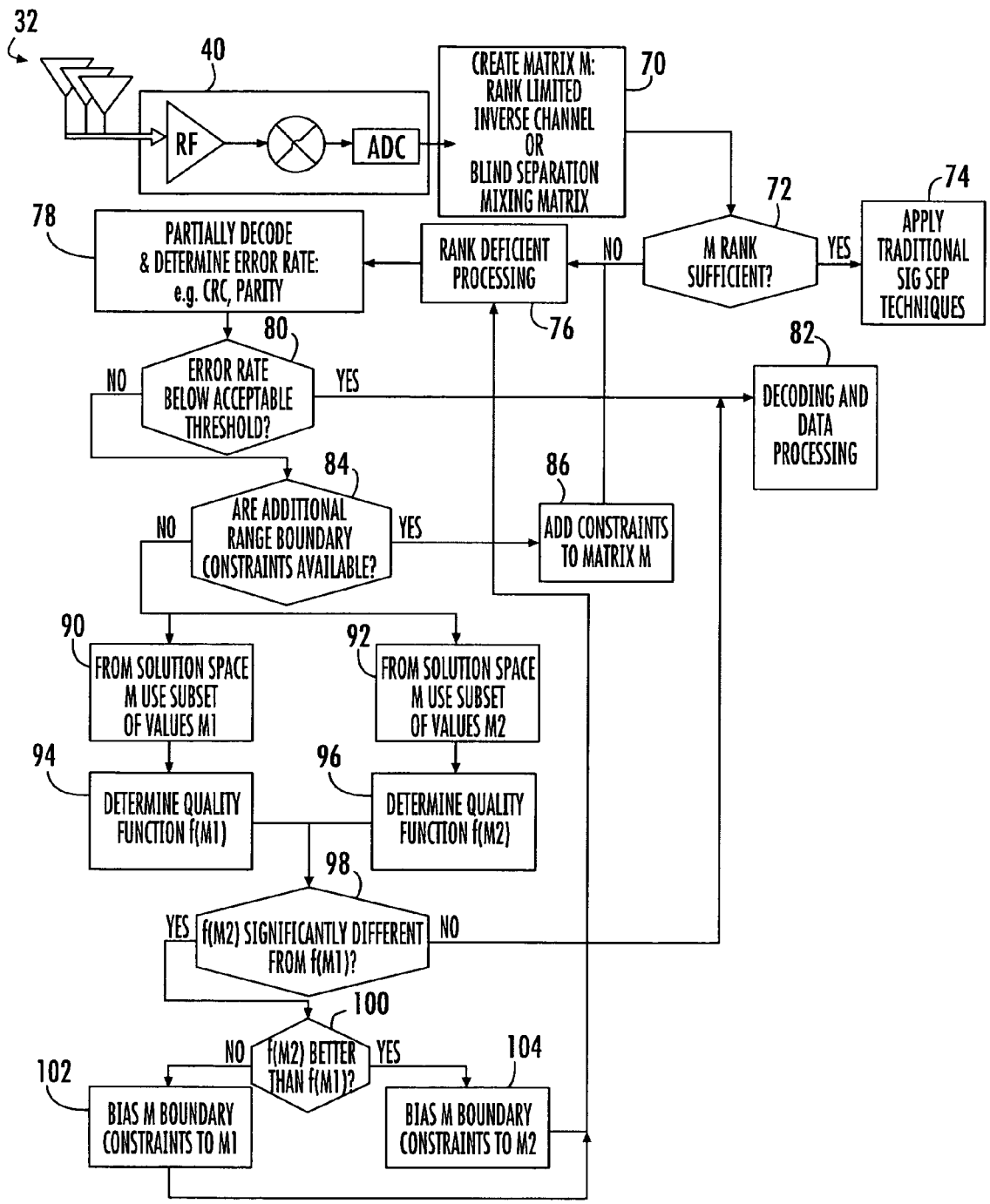
FIG. 3 is a generic flow chart for processing a rank deficient matrix in accordance with the present invention.

Even though Donoho has shown that under specific conditions rank deficient matrices can be uniquely solved, a problem remains that while the number of solutions may be reduced to a finite number or smaller range set, a unique solution may still not be obtained The present invention narrows the solution space via the solution space narrowing processing module 46 when the Donoho method (or some other rank deficient processing method) is not able to separate the signals in a rank deficient matrix Processing of the underdetermined matrix 36 for narrowing the solution space by generic means will initially be discussed with reference to the flow chart in FIG. 3. This particular flow chart provides a generic overview of how the solution space for an underdetermined matrix 36 is narrowed when an error rate of the separated signals using convex optimization is not acceptable based upon convex optimization.

First, the antenna array 32 receives different summations of the source signals 22(1)-22(M) from the plurality of signal sources 20(1)-20(M). The transceiver 40 is coupled to the antenna array for receiving the different summations of the source signals 20(1)-20(M). The signal separation processor module 38 is coupled to the receiver 40 for creating the matrix 36 in Block 70 based upon the different summations of the source signals 20(1)-20(M), wherein the matrix is defined by linear independent equations with fewer equations than unknowns, i.e., underdetermined. The matrix 36 will be either a channel matrix or a mixing matrix.

A decision is made in Block 72 to confirm if the rank of the matrix 36 is sufficient. If the matrix 36 does have a sufficient rank, i.e., the equations equal the unknowns, then traditional signal separation techniques are applied in Block 74 for separating the desired source signals from the plurality of source signals 22(1)-22(M).

Traditional signal separation techniques for rank sufficient matrices include principal component analysis (PCA), independent component analysis (ICA) and singular value decomposition (SVD). PCA involves first and second moment statistics of the source signals, and is used when the signal-to-noise ratios of the source signals are high. Otherwise, ICA is used which involves PCA processing followed by third and fourth moment statistics of the source signals As an alternative, SVD may be used to separate a source signal from the mixture of source signals based upon their eigenvalues. When the matrix is of the channel type, some traditional signal extraction techniques are minimum mean square estimation, zero forcing, and matched filtering.

If the matrix 36 does not have a sufficient rank, then rank deficient processing is applied to the matrix in Block 76. The rank deficient processing uses convex optimization for example, to separate the desired source signals from the undesired source signals as discussed above.

A portion of the separated desired source signal is decoded to determine an error rate associated therewith in Block 78. This error is compared to a threshold in Block 80. If the error rate is below an acceptable threshold, then the desired separated source signal is passed to Block 82 for decoding and data processing. If the error rate of the desired separated source signals is not acceptable, then processing continues to Block 84.

In Block 84, a determination is made if additional boundary constraints are available. If yes, then the constraints are added to the matrix 36 in Block 86, and the process loops back to Block 76. Adding additional range boundary constraints adds new entries into the matrix 36. Any entry or value in the matrix 36 may be changed, which in turns adds constraints to the matrix. For example, restrictions on the values in the matrix 36 may be greater than 0. Also, a range limit may be placed on certain values in the matrix 36, such as the power levels of the signals of interest are to be less than 0.5 watts, for example. Certain channel coefficients within the matrix 36 may also be modified.

As a result of anyone of a number of possible constraints, the rank of the matrix 36 is increased. If the rank is increased so that the error rate of the separated signals in Blocks 78 and 80 are below the acceptable threshold, then the process proceeds to Block 82 for decoding and data analysis.

If no additional constraints are available, then the parameters associated with the matrix 36 are modified based upon a first set of parameter values and at least one second set of parameter values. The first set of parameters is selected in Block 90, which is a subset M1 of the solution space for the matrix 36, which is also represented by the reference M in the flow chart. The at least one second set of parameter values is selected in Block 92, which is also a subset M2 of the solution space for M. The at least one second set could be one or more test areas even though the flowchart only shows a single second solution space M2. The subsets may be separate or they may overlap one another.

Based upon the first and second subset of values M1 and M2, respective matrix quality factors associated with the first set of parameter values and the at least one second set of parameter values are determined in Blocks 94 and 96. If the two quality factors are not significantly different as determined in Block 98, then the process proceeds to the decoding and data processing Block 83. If the determined quality values are significantly different from one another, then the subset of values corresponding to the better quality factor is used to bias the matrix in Block 102 or 104.

The biased matrix is then run through the rank deficient processing Block 76. The steps in Blocks 78-104 are repeated through an iterative cycle until the two different quality factors in Blocks 94, 96 are not significantly different from one another in Block 98. When this occurs, the process now continues to the decoding and data processing Block 82

Figure 4:
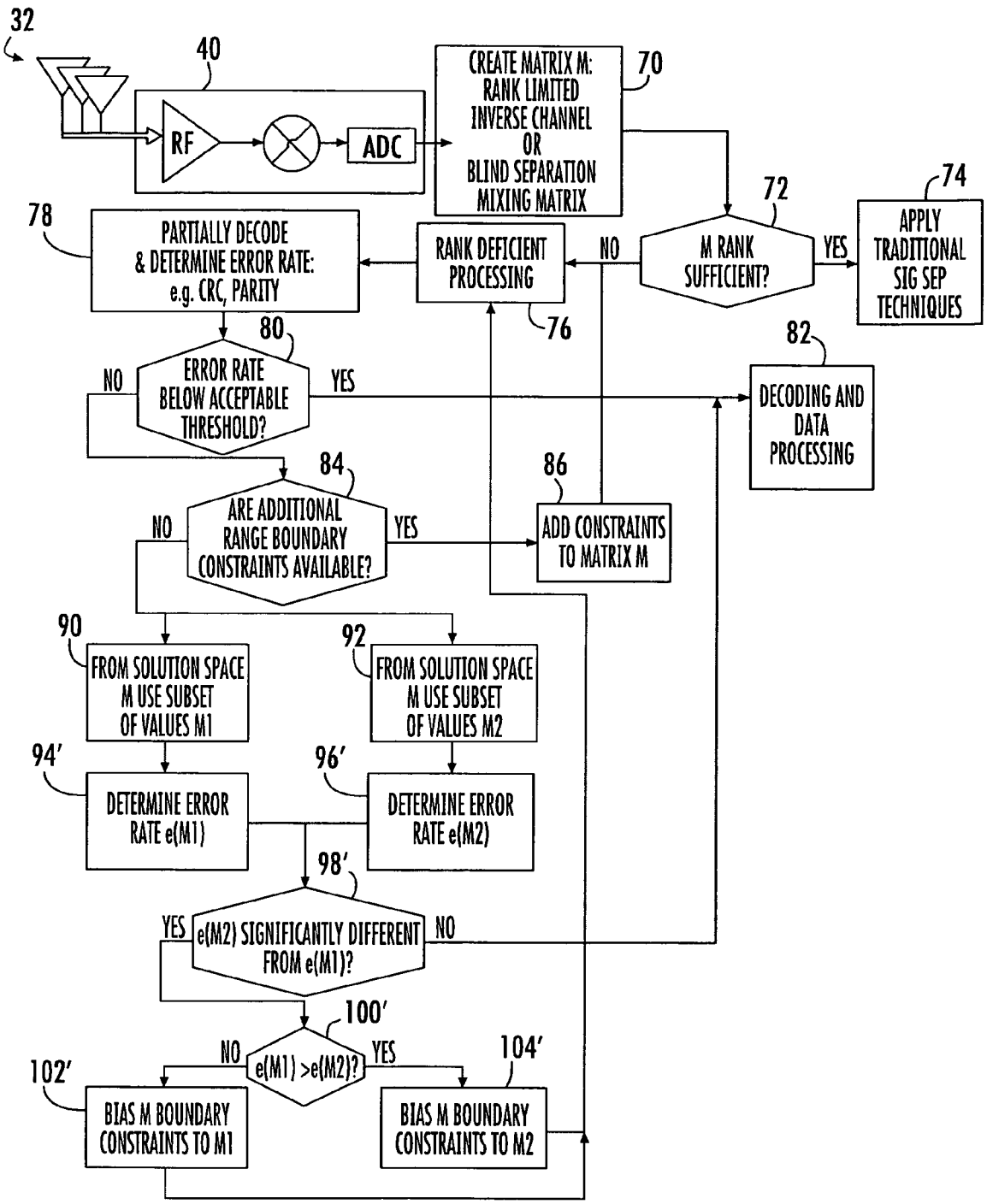
FIG. 4 is a more detailed flow chart for processing a rank deficient matrix based upon error rates in accordance with the present invention.
Figure 5:
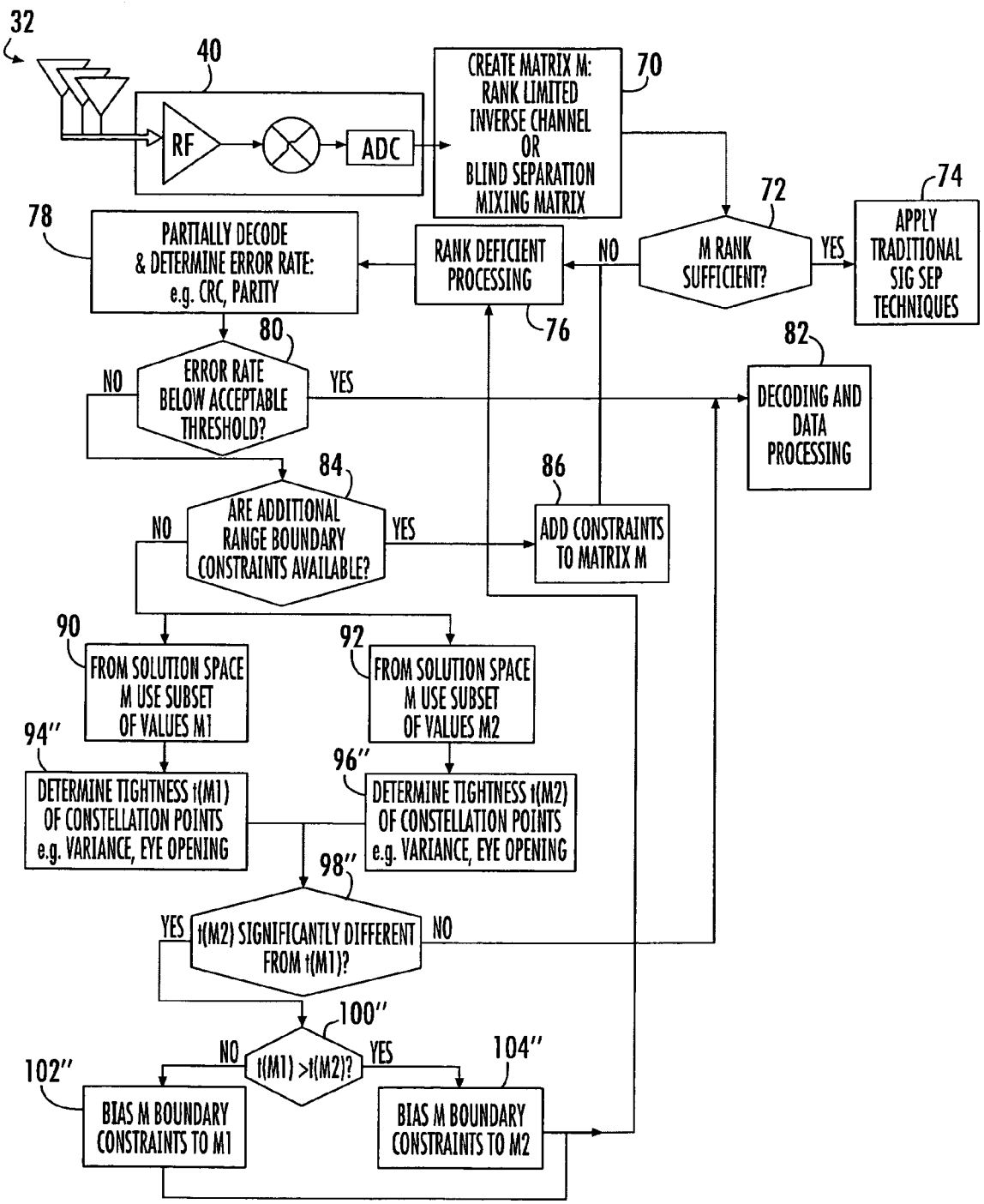
FIG. 5 is a more detailed flow chart for processing a rank deficient matrix based upon constellation tightness in accordance with the present invention.

FIG. 4 is similar to FIG. 3, but is directed to narrowing the solution space due to error rates. Blocks 94'-104' are similar to the generic Blocks 94-104 in FIG. 3, but are directed to the quality factor being associated with error rates. In particular, the parameters in Blocks 90, 92 associated with the matrix are modified so that the respective matrix quality factors in Blocks 94', 96' are based upon error rates associated with the first set of parameter values and the at least one second set of parameter values. The matrix 36 is biased based upon the parameters providing the lowest error rate, FIG. 5 is similar to FIG. 3, but is directed to narrowing the solution space due to constellation tightness. Blocks 94"-104" are similar to the generic Blocks 94-104 in FIG. 3, but are directed to the quality factor being associated with constellation points. In particular, the parameters in Blocks 90, 92 associated with the matrix are modified so that the respective matrix quality factors in Blocks 94", 96" are based upon a constellation tightness associated with the first set of parameter values and the at least one second set of parameter values. The matrix 36 is biased based upon the parameters providing the tightest grouping of constellation points.

Figure 6:
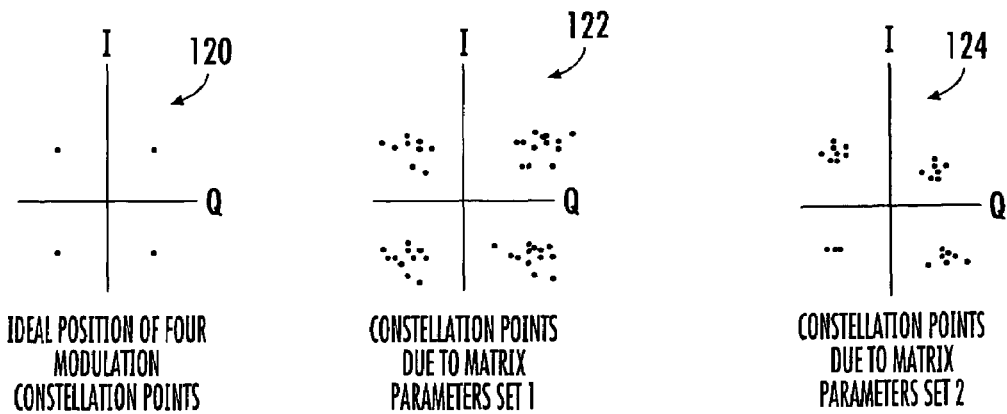
FIG. 6 is a plot of different constellation points based upon different matrix parameters in accordance with the present invention.

For a better illustration of constellation points, reference is directed to FIG. 6. The ideal position of four modulation constellation points is provided in plot 120. The tightness of the first set of parameters associated with the constellation points in Block 90 is provided in plot 122. Similarly, the tightness of the second set of parameters associated with the constellation points in Block 92 is provided in plot 124. As shown, the second parameter set in Block 92 is more tightly distributed around the constellation points than the first set of parameters in Block 90. The second set of parameters is selected in Block 100". One means for determining this mathematically is by determining the average distance between the points in each quadrant.

Figure 7:
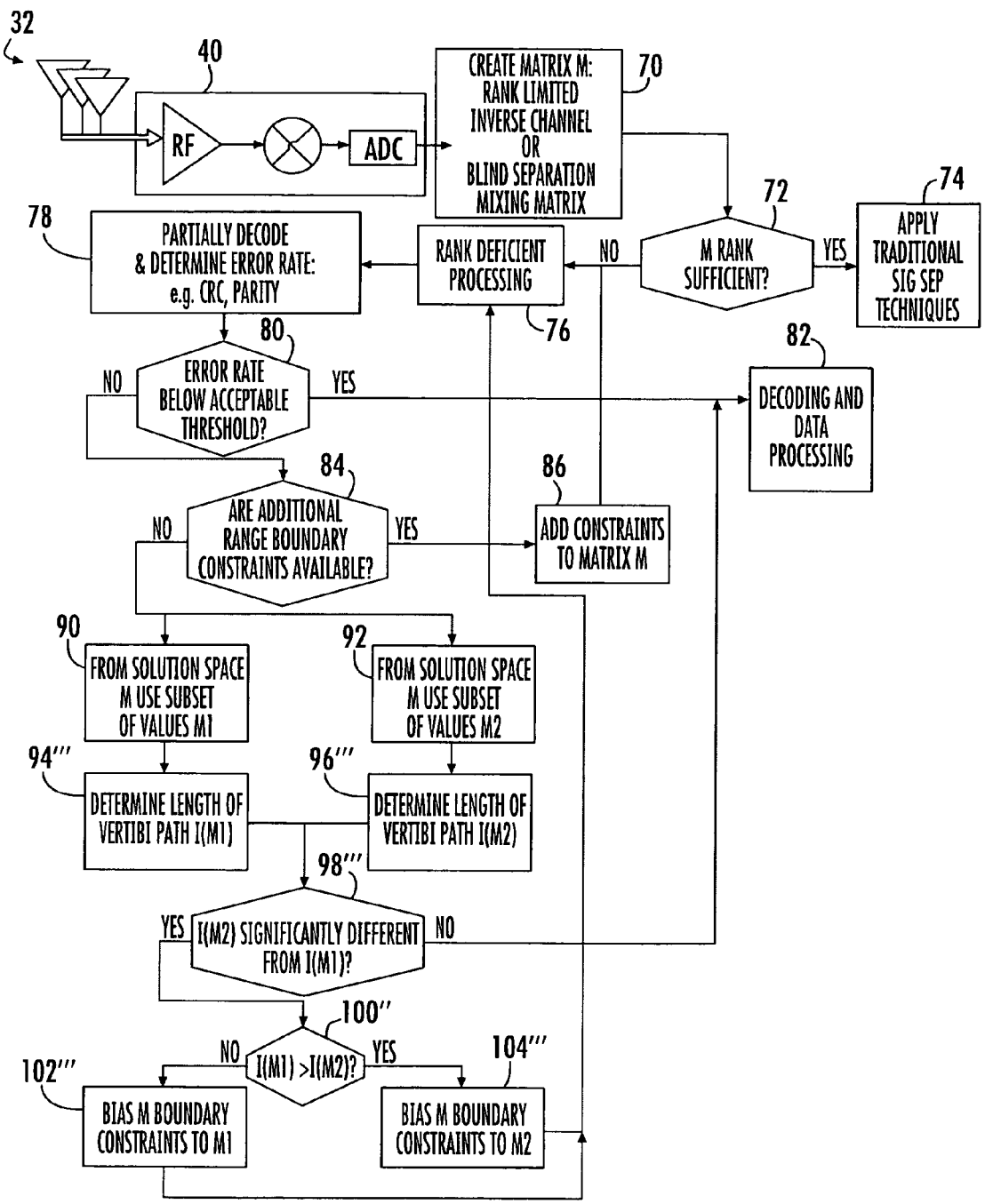
FIG. 7 is a more detailed flow chart for processing a rank deficient matrix based upon Viterbi path lengths in accordance with the present invention.

FIG. 7 is similar to FIG. 3, but is directed to narrowing the solution space due to Viterbi path lengths. Blocks 94'''-104''' are similar to the generic Blocks 94-104 in FIG. 3, but are directed to the quality factor being associated with Viterbi path lengths. In particular, the parameters in Blocks 90, 92 associated with the matrix are modified so that the respective matrix quality factors in Blocks 94''', 96''' are based upon Viterbi path lengths associated with the first set of parameter values and the at least one second set of parameter values. The matrix 36 is biased based upon the parameters providing the shortest Viterbi path length.

Figure 8:
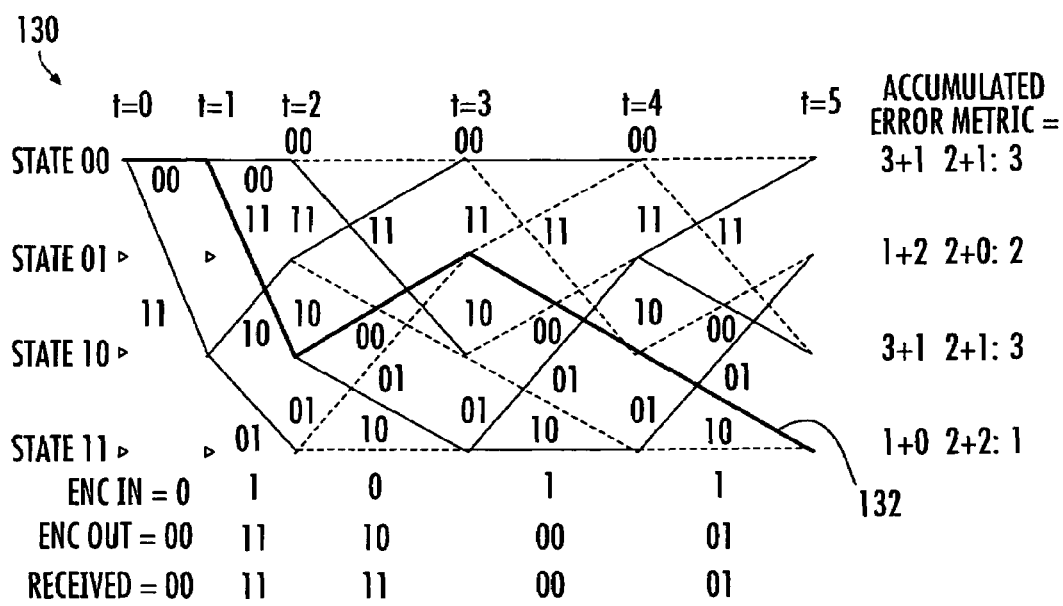
FIG. 8 is a diagram of a Viterbi trellis and a trace back there through in accordance with the present invention.

For a better illustration of Viterbi path lengths, reference is directed to FIG. 8. The Viterbi trellis 130 illustrates several trace backs between the various states. The M parameters which produce the shortest path through the trellis would be picked for the next iteration of the rank deficient processing in Block 76. At t=5 for example, the path 132 through the trellis 130 corresponding to the actual message is still associated with the smallest accumulated error metric. This is exploited by the Viterbi decoder to recover the original message.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
    an antenna array for receiving different summations of source signals from a plurality of signal sources;
    a receiver coupled to said antenna array for receiving the different summations of source signals; and
    a signal separation processor coupled to said receiver for
        creating a matrix based upon the different summations of source signals, the matrix being defined by linear independent equations with fewer equations than unknowns,
        separating from the matrix a desired source signal from the plurality of source signals,
        determining an error rate associated with the desired source signal, and comparing the error rate to a threshold,
        if the error rate is not acceptable based upon the comparing, then modifying parameters associated with the matrix based upon a first set of parameter values and based upon at least one second set of parameter values,
        determining respective matrix quality factors associated with the first set of parameter values and with the at least one second set of parameter values,
        comparing the respective matrix quality factors for determining a preferred set of parameter values, and
        biasing the matrix with the preferred set of parameter values.

2. A communications device according to claim 1 further comprising separating from the biased matrix the desired source signal from the plurality of source signals.

3. A communications device according to claim 1 further comprising repeating for the biased matrix the separating, determining of the error rate and the comparing thereof, the modifying, determining of the respective matrix quality factors, the comparing for determining a new preferred set of parameter values, and biasing of the biased matrix with the new preferred set of parameter values.

4. A communications device according to claim 1 wherein the parameters associated with the matrix are modified so that the respective matrix quality factors are based upon error rates associated with the first set of parameter values and the at least one second set of parameter values.

5. A communications device according to claim 1 wherein the parameters associated with the matrix are modified so that the respective matrix quality factors are based upon constellation clouds associated with the first set of parameter values and the at least one second set of parameter values.

6. A communications device according to claim 1 wherein the parameters associated with the matrix are modified so that the respective matrix quality factors are based upon determined lengths of Viterbi paths associated with the first set of parameter values and the at least one second set of parameter values.

7. A communications device according to claim 1 wherein each set of parameter values associated with the matrix corresponds to a range interval of solutions of the matrix.

8. A communications device according to claim 7 wherein at least a portion of the range intervals of solutions overlap.

9. A communications device according to claim 1 wherein the linear independent equations include channel coefficients; and wherein each set of parameter values associated with the matrix corresponds to a range interval of the channel coefficients.

10. A communications device according to claim 1 wherein creating the matrix includes determining a power level of the different summations of source signals; and wherein each set of parameter values associated with the matrix corresponds to a range interval of the power levels.

11. A communications device according to claim 1 wherein separating from the matrix the desired source signal from the plurality of source signals is based upon at least one of a Kolmogorov complexity minimization and a convex optimization.

12. A communications device according to claim 1 wherein the error rate is compared to a threshold for determining acceptability.

13. A communications device according to claim 1 wherein after determining the error rate and before determining the respective matrix quality factors; further comprising adding entries to the matrix so that a number of the unknowns in the matrix is reduced.

14. A communications device according to claim 13 wherein the entries are added based upon at least one of adjusting range intervals of the matrix, adjusting relationships between entries, and adjusting power levels of the matrix entries.

15. A communications device according to claim 1 wherein said antenna array comprises at least one antenna element.

16. A communications device according to claim 15 wherein said at least one antenna element comprises a plurality of active antenna elements so that said antenna array forms a phased array.

17. A communications device according to claim 15 wherein said at least one antenna element comprises a plurality of active antenna elements so that said antenna array forms a switched beam antenna.

18. A communications device according to claim 1 wherein said antenna array comprises a ground plane adjacent said at least one antenna element; and wherein said at least one antenna element comprises an active antenna element;
at least one passive antenna elements comprising an upper half and a corresponding lower half, and a variable reactive load connecting said upper half to said ground plane for changing an antenna pattern.

19. A communications device according to claim 1 wherein said antenna array comprises a ground plane adjacent said at least one antenna element; and further comprising a controller coupled to said ground plane for changing an antenna pattern.

20. A method for operating a communications device comprising:
receiving at the antenna array different summations of source signals from a plurality of signal sources;
providing the different summations of source signals to the receiver; and
processing by the signal separation processor the different summations of the source signals received by the receiver, the processing comprising
creating a matrix based upon the different summations of source signals, the matrix being defined by linear independent equations with fewer equations than unknowns,
separating from the matrix a desired source signal from the plurality of source signals,
determining an error rate associated with the desired source signal, and comparing the error rate to a threshold,
if the error rate is not acceptable based upon the comparing, then modifying parameters associated with the matrix based upon a first set of parameter values and at least one second set of parameter values,
determining respective matrix quality factors associated with the first set of parameter values and the at least one second set of parameter values,
comparing the respective matrix quality factors for determining a preferred set of parameter values,
biasing the matrix with the preferred set of parameter values, and
separating from the biased matrix the desired source signal from the plurality of source signals.

21. A method according to claim 20 further comprising repeating for the biased matrix the separating, determining of the error rate and the comparing thereof, the modifying, determining of the respective matrix quality factors, the comparing for determining a new preferred set of parameter values, and biasing of the biased matrix with the new preferred set of parameter values.

22. A method according to claim 20 wherein the parameters associated with the matrix are modified so that the respective matrix quality factors are based upon error rates associated with the first set of parameter values and the at least one second set of parameter values.

23. A method according to claim 20 wherein the parameters associated with the matrix are modified so that the respective matrix quality factors are based upon constellation clouds associated with the first set of parameter values and the at least one second set of parameter values.

24. A method according to claim 20 wherein the parameters associated with the matrix are modified so that the respective matrix quality factors are based upon determined lengths of Viterbi paths associated with the first set of parameter values and the at least one second set of parameter values.

25. A method according to claim 20 wherein each set of parameter values associated with the matrix corresponds to a range interval of solutions of the matrix.

26. A method according to claim 25 wherein at least a portion of the range intervals of solutions overlap.

27. A method according to claim 20 wherein the linear independent equations include channel coefficients; and wherein each set of parameter values associated with the matrix corresponds to a range interval of the channel coefficients.

28. A method according to claim 20 wherein creating the matrix includes determining a power level of the different summations of source signals; wherein involves adjusting relationships between entries; and wherein each set of parameter values associated with the matrix corresponds to a range interval of the power levels.

29. A method according to claim 20 wherein separating from the matrix the desired source signal from the plurality of source signals is based upon at least one of a Kolmogorov complexity minimization and a convex optimization.

30. A method according to claim 20 wherein the error rate is compared to a threshold for determining acceptability.

31. A method according to claim 20 wherein after determining the error rate and before determining the respective matrix quality factors; further comprising adding entries to the matrix so that a number of the unknowns in the matrix is reduced.

32. A method according to claim 31 wherein the entries are added based upon at least one of adjusting range intervals of the matrix, adjusting relationships between entries, and adjusting power levels of the matrix entries.

33. A method according to claim 31 wherein the entries are added based upon at least one of adjusting range intervals of the matrix, and adjusting power levels of the matrix.

34. A method according to claim 20 wherein the antenna array comprises at least one antenna element.

* * * * *

UNITED STATES PATENT AND TRADEMARK OFFICE
CERTIFICATE OF CORRECTION

PATENT NO. : 7,330,801 B2 Page 1 of 3
APPLICATION NO. : 11/461094
DATED : February 12, 2008
INVENTOR(S) : Goldberg et al.

It is certified that error appears in the above-identified patent and that said Letters Patent is hereby corrected as shown below:

In the Drawings:   Delete: "Fig: 7"

Insert: --New Figure 7--

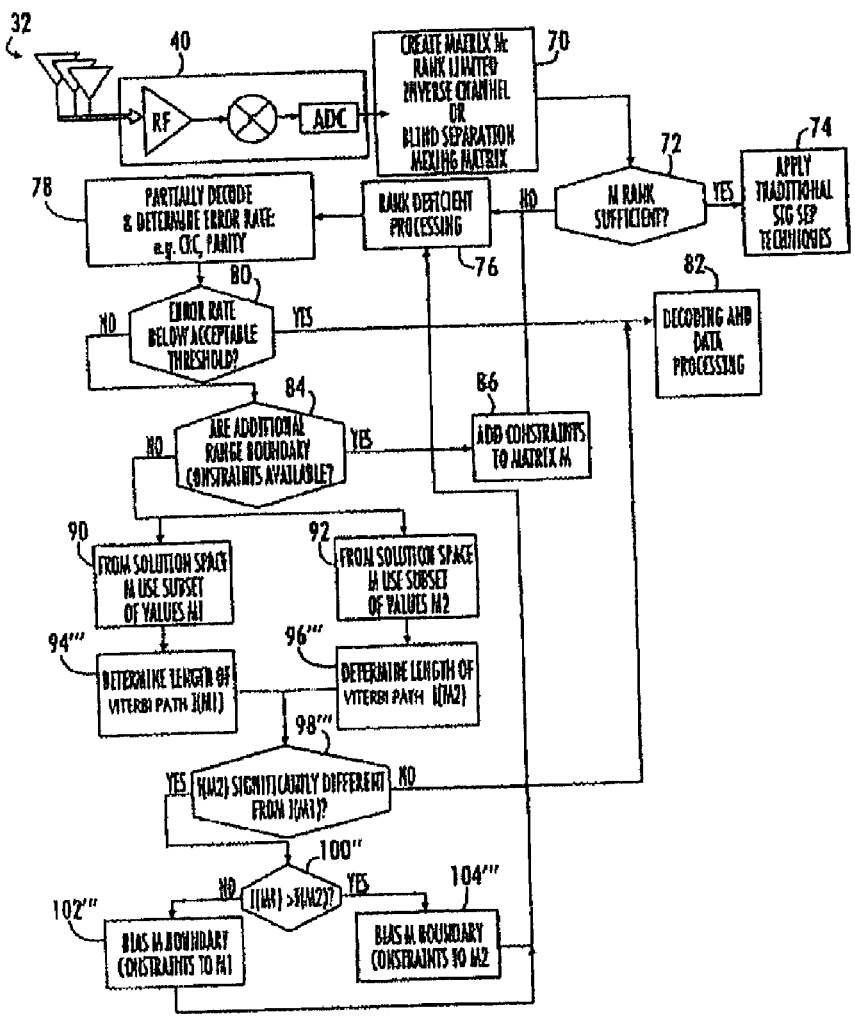

FIG. 7

UNITED STATES PATENT AND TRADEMARK OFFICE
CERTIFICATE OF CORRECTION

PATENT NO. : 7,330,801 B2
APPLICATION NO. : 11/461094
DATED : February 12, 2008
INVENTOR(S) : Goldberg et al.

It is certified that error appears in the above-identified patent and that said Letters Patent is hereby corrected as shown below:

| | |
|---|---|
| Column 1, Line 34 | Delete: "exploited"<br>Insert: --exploited.-- |
| Column 1, Line 37 | Delete: "separation"<br>Insert: --separation.-- |
| Column 1, Line 39 | Delete: "procedures"<br>Insert: --procedures.-- |
| Column 1, Line 50 | Delete: "vector"<br>Insert: --vector.-- |
| Column 2, Line 35 | Delete: "devices"<br>Insert: --device-- |
| Column 3, Line 27 | Delete: "signals"<br>Insert: --signals.-- |
| Column 5, Line 8 | Delete: "20,"<br>Insert: --20.-- |
| Column 5, Line 50 | Delete: "from"<br>Insert: --from.-- |
| Column 6, Line 8 | Delete: "elements"<br>Insert: --element-- |
| Column 6, Line 62 | Delete: "entirety"<br>Insert: --entirety.-- |
| Column 7, Line 39 | Delete: "signals"<br>Insert: --signals.-- |
| Column 8, Line 35 | Delete: "82"<br>Insert: --82.-- |

UNITED STATES PATENT AND TRADEMARK OFFICE
CERTIFICATE OF CORRECTION

PATENT NO.       : 7,330,801 B2
APPLICATION NO.  : 11/461094
DATED            : February 12, 2008
INVENTOR(S)      : Goldberg et al.

It is certified that error appears in the above-identified patent and that said Letters Patent is hereby corrected as shown below:

Column 8, Line 45          Delete: "rate,"
                           Insert: --rate.--

Signed and Sealed this

Nineteenth Day of August, 2008

JON W. DUDAS
*Director of the United States Patent and Trademark Office*